Feb. 24, 1970   D. R. BARTLEY ET AL   3,496,983

PNEUMATIC TIRE ASSEMBLY

Filed Nov. 14, 1967

INVENTORS
DONALD R. BARTLEY
ARMANDO CARDENAS
FRANK S. VUKAN
BY W. A. Shira, Jr.   ATTY.

United States Patent Office 3,496,983
Patented Feb. 24, 1970

3,496,983
PNEUMATIC TIRE ASSEMBLY
Donald R. Bartley, 1940 9th St., and Armando Cardenas, 3327 W. Bailey Road, both of Cuyahoga Falls, Ohio 44221, and Frank S. Vukan, 3875 Kenwood Drive, Stow, Ohio 44224
Filed Nov. 14, 1967, Ser. No. 682,880
Int. Cl. B60c 5/04
U.S. Cl. 152—340                                              6 Claims

ABSTRACT OF THE DISCLOSURE

An inflatable safety tire assembly and method of making same comprising an outer tire of the tubeless type and an inflatable inner member or safety shield wound on a cylindrical drum from a continuous tape of elastomer-covered cord, the tire and shield forming two separate inflation chambers within the assembly for maintaining it serviceable upon loss of inflation medium from the outer tire.

BACKGROUND OF THE INVENTION

Loss of inflation pressure from a pneumatic tire for a vehicle ordinarily prevents its further operation for any significant distance. When this occurs at high speeds, there can be loss of control of the vehicle. One way of providing protection against such occurrences is to provide a second inflated member within the tire thereby providing a separate chamber which will remain inflated upon loss of the inflating medium from the outer tire. In order for the inner safety member or shield to effectively provide a separate inflating chamber, a seal must be provided between the beads of the shield and the outer tire or wheel rim. Sealing between the beads of the inner member or safety shield and the outer tire by providing ledges on the tire, cementing the inner member to the tire, or by other known expedients results in an expensive construction that is difficult to mount on the wheel rim. Sealing between beads of the inner member and the wheel rim can only be accomplished, without separate mechanical clamping means, if the beads of the inner member or safety shield are sufficiently inextensible to withstand circumferential elongation when the inner member is inflated.

The most common means used for imparting circumferential inextensibility to the bead is that of providing a continuous wire reinforcing core in the bead. A wire reinforced bead is sufficiently inextensible to provide a rim seal. However, it is also quite rigid and resistant to bending, and it is, therefore, difficult to effect proper assembly of the inner member or safety shield and the outer tire onto the rim. Often when assembling the safety shield into the tire, it is necessary to bend or buckle the beads of the shield to permit insertion into the tire. This is particularly the case during the installation of large size and heavy duty tires where a heavy bead is required to absorb the higher loads; therefore, the installation is rendered more difficult by a stiff bead.

SUMMARY OF THE INVENTION

The present invention provides a solution to the above difficulties by using an inner safety shield or annular member wound from a continuous tape of elastomer covered cords with axially spaced beads formed of tangentially disposed windings of the tape, thereby providing inextensible beads which remain flexible after vulcanization. The tape wound safety shield is initially assembled within an outer tubeless tire of conventional construction; the assembly is then mounted on the tire rim with the bead portions of both the outer tire and the inner shield supporter upon the same bead seats of the rim. This is made possible by the flexible nature of the bead portions of the safety shield which permit it to be deformed or folded upon itself or buckled in a manner convenient for insertion into the tire. The construction provides a shield with sufficient resistance to deformation to return to its normal configuration within the tire, so that both the beads of the outer tire and of the inner shield mount and seal on the same bead seat portions of the standard wheel rim and the bead portions of the inner shield are in resilient contact with the inside faces of the adjacent tire bead.

The outer periphery of the inner member is spaced from the inner periphery of the outer tire providing a first inflation chamber therebetween and a second inflation chamber inwardly of the inner shield which chambers are separately inflated by suitable valve means. The inner chamber is inflated to a slightly higher pressure than the outer chamber such that loss of inflation pressure allows the shield to remain inflated thereby tensioning the tangentially tape wound reinforcing cords in the bead causing the bead to contract radially on to the rim flange, which increases the effectiveness of the bead in remaining sealed on the shield. The invention thus comprises a tubeless tire having a pneumatic separate inner safety chamber formed by a vulcanized tape wound carcass having flexible beads.

DETAILED DESCRIPTION

The carcass of an inner member or safety shield of the present invention is wound continually of a tape of elastomeric material having continuous reinforcing cords. The carcass is formed by winding the tape in a substantially geodesic pattern on a drum. One of the methods which may be utilized for winding a carcass is that of rotating the drum on its axis and simultaneously orbiting it about another fixed axis skewed to the drum as taught by U.S. Patent No. 3,112,234.

Figure 1:
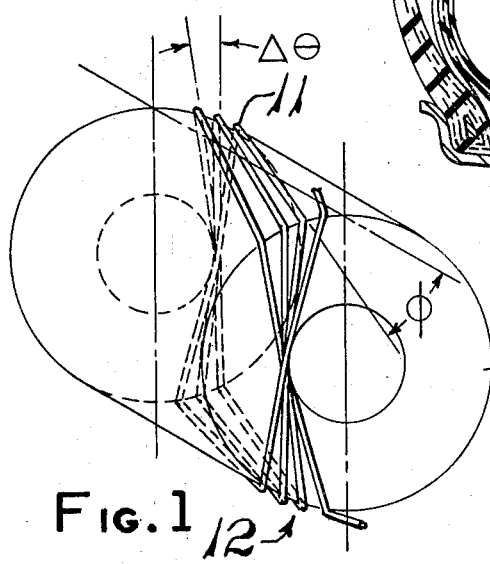
FIG. 1 is a diagrammatic perspective view of a collapsible building drum upon which the carcass of the inner member or safety shield is being continually wound from tape.

Referring now to FIG. 1, a preferably straight cylindrical building drum 10 having a collapsing mechanism (not shown) for removing the drum from a completed carcass is diagrammatically represented with the beginning of a tape wound carcass 12 wrapped therearound. A tape 11 of elastomeric material having cord reinforcement of preferably calendered stock is continuously wound around the drum in a substantially geodesic pattern forming successive straight tangents to the desired inner bead circle. The tape 11 is wound such that it makes an angle $\Phi$ shown in FIG. 1 with the axis of the tire when passing over the cylindrical surface of the building drum where $$30° \leq \Phi \leq 60°$$

In the preferred practice a straight cylindrical drum is used instead of the more common spherical drum in order to permit improved tangential arrangement of the tape winding for forming the bands. Each successive revolution of the winding tape is indexed an amount to subtend a central radial angle $\Delta\theta$ as shown in FIG. 1 with the previous winding. The angle $\Delta\theta$ is constant for all the winding on a given carcass and is chosen to have a value expressed in radians within the limits $$\frac{\pi}{60} \leq \Delta\theta \leq \frac{60}{61}\pi$$

In the presently preferred form of the invention, the drum axis is positioned at an angle $\Phi$ with a turntable and with the turntable axis passing through the centroid of the drum. The tape is fed continuously to the drum while the turntable is rotated. The drum is rotated at generally a constant speed about its axis and moves through a central angle $\Delta\theta$ for every revolution of the turntable. In this manner successive layers of windings may be continuously wound on the drum; however, the invention is not limited to this method of winding elastomeric tape and any other suitable method may be used.

The tape is wound until the drum has been completely covered, the beads being formed by overlapping tapes tangential to the bead circle. The construction of tangentially disposed overlapping windings of tape provides a bead structure which resists the circumferential stresses of inflation more efficiently by imparting direct tensile loads in the tape winding.

The layer 12b of elastomeric material substantially impervious to air is pre-placed over the drum before the tape winding is begun. The layer of air impervious material is applied in a continuous layer and serves as a liner to the inner shield for preventing loss of inflating medium for tubeless shield inflation. In the presently preferred embodiment, the layer 12b is made of butyl rubber. Alternatively, the layer 12b may be omitted and the inner member inflated by an inner tube (not shown). An annular layer of elastomeric material is applied intermediate the ends for forming ribs 12a on the exterior of the carcass. The completed shield or inner member 12 is removed from the drum 10 after the winding is completed and is subsequently expanded and vulcanized to the desired inflated configuration. The usual manner of vulcanization is that of inserting an inflatable bladder (not shown) in the shield for expanding the shield carcass to conform to the contour of an external mold.

Figure 2:
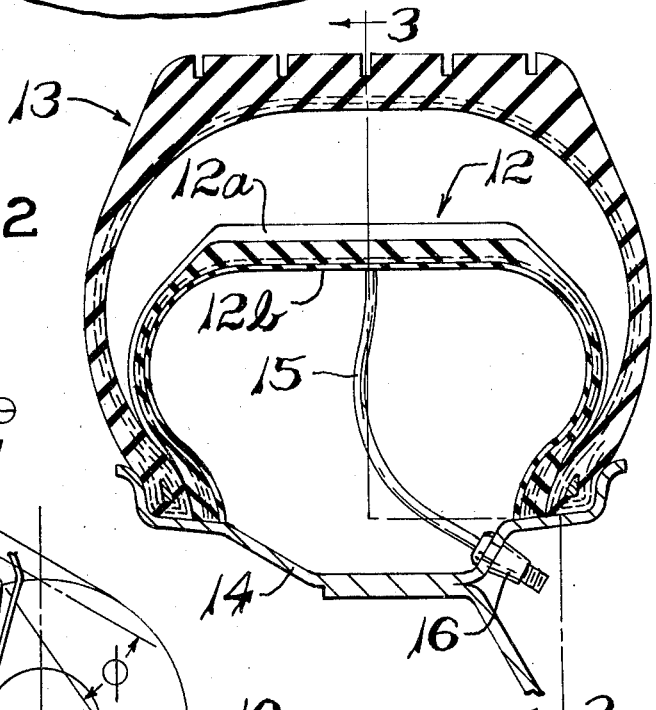
FIG. 2 is a section view of a portion of the tire installed on a rim and is shown sectioned axially.

Referring now to FIG. 2, the vulcanized shield 12 is shown mounted on a wheel rim inside of a conventional tubeless tire 13, formed of elastomeric material with reinforcing cords therein and the said tire having spaced beads and a pair of side-walls interconnected by a tread portion to form a continuous inflating chamber therein.

Figure 3:
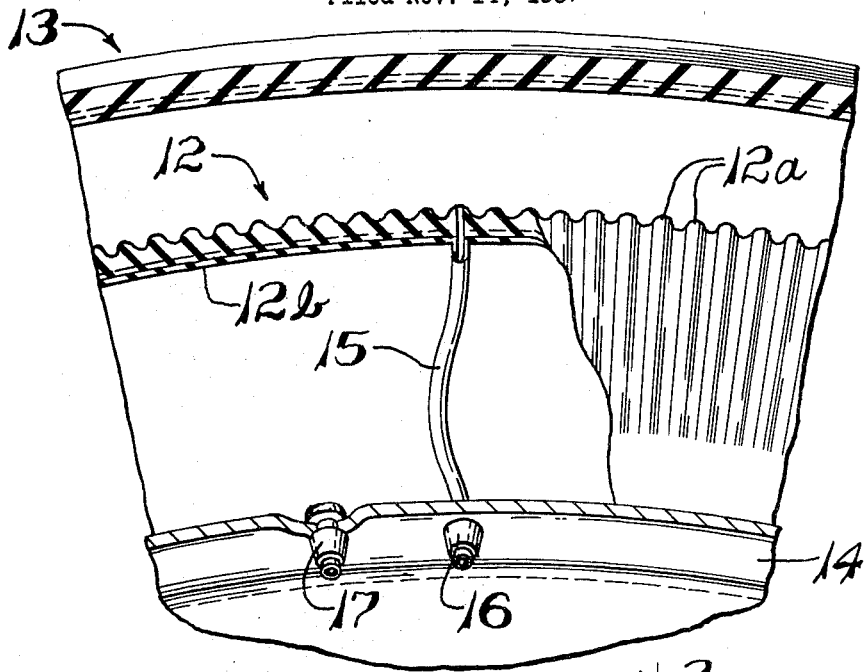
FIG. 3 is a view partially in section and partially in elevation taken substantially along section-indicating lines 3—3 of FIG. 2.

FIG. 3 is a partial sectional view of FIG. 2 and shows the details of radial lugs or ribs 12a molded on the exterior surface of the shield 12. For tubeless inflation each of the ribs 12a extends radially from a point adjacent one bead of the inner shield axially over the crown to a point adjacent the opposite bead. Where the inner shield is to be tubelessly inflated, the ribs 12 must not extend into the beads of the shield in order to allow proper sealing between the rim, the shield beads and the axially inner surface of the outer tire beads. If the shield is inflated by means of an inner tube, the ribs 12 may extend to the radially inner edge of the beads, as it is not necessary in this case to seal between the beads of the inner shield and the rim nor between the beads of the inner shield and the outer tire. In the event of loss of inflation pressure in the outer chamber, the ribbed surface of the inner member makes contact with the inner surface of the outer tire 13. The ribs 12a provide an abrasion resistant surface for contact during rolling between the inner shield and the outer tire thereby preventing rapid deterioration and failure of the shield when it is running under load after deflation of the outer chamber.

An audible warning device may be provided for indicating loss of inflation in the outer chamber. The audible warning may be provided for example, by variation in the radial height of the ribs 12a. However, in the preferred form of the invention, a hard piece of elastomer or other material is inserted between the first tape windings and the drum to form a permanent lump or lobe in the vulcanized carcass of the inner shield 12, which lobe (not shown), causes a bump or thumping when the outer chamber is deflated and the inner shield 12 is in running contact with the inner surface of the outer tire 13.

Referring again to FIG. 3, separate valve means 16 and 17 are shown penetrating the rim 14 for tubeless inflation of the separate chamber. In the presently preferred embodiment illustrated in FIG. 2, a first valve 16 has an umbilical cord 15 of flexible material attached in air-conducting relationship between the inner end of the valve and an orifice in the shield for conducting the inflating medium directly through the valve 16 into the chamber formed between the outer surface of the shield 12 and the inner surface of the tire 13. The umbilical cord 15 is installed in the shield subsequent to vulcanization of the latter. A second valve 17 is mounted through the rim in conventional manner so that its orifice admits the inflating medium directly into the chamber formed by the inner surface of the shield and the rim. Hence, the shield 12 is inflatable independently of the outer tire. An alternate form of providing separate inflation passages (not shown) is a single dual-chamber valve extending through the rim such that one orifice of the valve discharges into the umbilical cord 15 and the other orifice discharges into the chamber within the shield 12 and the rim 14, space is formed by the protruding ribs 12a.

The inner member 12 may alternatively be inflated by inserting an inflatable bladder or inner tube therein, as opposed to having the beads sealed on the rim and the member 12 tubelessly inflated. Where an inner tube or bladder is used to inflate the inner member 12, it is obvious that the umbilical cord 15 would not be used. A bladder or inner tube can be inflated by a separate valve communicating inflating fluid through the rim to the inner tube. The member 12 having a bladder or inner tube therein may be inflated by another means, namely a dual chamber valve through the rim, having one orifice communicating with the chamber within the bladder or inner tube and another orifice communicating directly with the chamber between the outer tire 13 and the inner member 12. When an inner tube is used the beads of the inner shield need not seal on the rim and inflating fluid can therefore pass under the shield bead and into the space between the inner shield 12 and the outer tire 15. However, if desirable, two separate valves may also be used instead of a single dual-orifice valve.

In the presently preferred practice, the shield is initially inflated to a desired pressure through the second valve 17 and the tire 13 is subsequently inflated to a lesser pressure through the first valve 16 and the umbilical cord 15. For passenger car tire use, the inner chamber formed by the shield 12 and the rim 14 is generally inflated to a pressure which is 5–10 p.s.i. higher than the pressure to which the outer chamber is inflated. For heavy duty tire use such as for truck tires, the inner chamber formed by the shield 12 and the rim 14 is inflated to a pressure 10 to 15 p.s.i. higher than the pressure to which the outer chamber is inflated.

The present invention thus comprises a two-chamber pneumatic tire having the inner chamber formed by an inner sealed member of vulcanized continually wound tape construction with flexible beads for ease of assembly.

Modifications and adaptations may be made within the purview of the invention by those having ordinary skill in the art and the invention is limited only by the appended claims.

What is claimed is:

1. A pneumatic tire assembly providing two separate inner chambers for retaining an inflating medium therein comprising:

(a) a tubeless pneumatic outer tire of cord-reinforced elastomeric material having axially spaced beads adapted for mounting on a wheel rim; and (b) an inner shield member wound from a continuous tape of elastomer covered cords extending in a generally geodesic overlapping pattern defining an annular carcass with axially spaced bead portions of a diameter substantially equal to the diameter of the beads of said outer tire and with the diameter of the radially outer portion of said inner member axially intermediate between said bead portions of the member less than the inflated inner diameter of the corresponding portion of said outer tire, the said inner member being adapted to be positioned within the outer tire with the bead portions of the inner member mounted upon the same rim bead seats as the beads of the outer tire thereby defining a first inflating chamber between said outer tire and inner member and a second inflating chamber inwardly of said inner member.

2. The tire assembly as defined in claim 1, wherein the said inner member has an outer cover of elastomer provided with a plurality of circumferentialy spaced grooves, with each groove extending radially and axially continuously from a point adjacent one bead portion to a point adjacent the opposite bead portion for allowing the passage of air and preventing abrasion between the inner member and the outer tire when pressure is lost from the said first chamber.

3. The tire assembly as defined in claim 1 wherein said inner member tubelessly inflated has a liner of elastomeric material impervious to the inflating medium for preventing passage therethrough of the inflating medium.

4. The tire assembly as defined in claim 1 wherein the said bead portions of said inner member are formed by generally tangentially extending portions of the elastomer covered tape.

5. The tire assembly as defined in claim 1 in combination with a wheel rim provided with tire inflating means, the said inflating means comprising passages for discharging an inflating medium separately into said first chamber and into said second chamber.

6. The tire assembly as defined in claim 1 in combination with a wheel rim provided with tire inflating means, the said inflating means comprising:
 (a) a filling valve member penetrating the wheel rim for communicating with said second chamber; and
 (b) a flexible tube intercommunicating the inflating medium from said first chamber with a valve member passing through said rim for allowing passage of inflating medium directly into the said first chamber.

References Cited

UNITED STATES PATENTS

| | | | |
|---|---|---|---|
| 2,906,314 | 9/1959 | Trevaskis | 152—356 |
| 3,191,654 | 6/1965 | Anderson et al. | 152—341 |
| 3,318,325 | 5/1967 | Siedow | 152—341 |

ARTHUR L. LA POINT, Primary Examiner

CHARLES B. LYON, Assistant Examiner